(12) United States Patent
Gasbjerg (10) Patent No.: US 11,817,683 B2
(45) Date of Patent: Nov. 14, 2023

(54) CABLE TRAY INCLUDING U-BENT WIRES HAVING A FIRST SIDEWALL WITH A WAVY SHAPE FOR RECEIVING LATERALLY PLACED CABLES

(71) Applicant: Siltec A/S, Silkeborg (DK)

(72) Inventor: Frank Hviid Gasbjerg, Skanderborg (DK)

(73) Assignee: Siltec A/S, Silkeborg (DK)

( * ) Notice: Subject to any disclaimer, the term of this patent is extended or adjusted under 35 U.S.C. 154(b) by 269 days.

(21) Appl. No.: 17/418,639

(22) PCT Filed: Dec. 20, 2019

(86) PCT No.: PCT/DK2019/050422
§ 371 (c)(1),
(2) Date: Jun. 25, 2021

(87) PCT Pub. No.: WO2020/141008
PCT Pub. Date: Jul. 9, 2020

(65) Prior Publication Data
US 2022/0069556 A1 Mar. 3, 2022

(51) Int. Cl.
*H02G 3/04* (2006.01)

(52) U.S. Cl.
CPC ......... *H02G 3/0443* (2013.01); *H02G 3/0406* (2013.01)

(58) Field of Classification Search
CPC ............................ H02G 3/0443; H02G 3/0406
USPC ....................................................... 174/135
See application file for complete search history.

(56) References Cited

U.S. PATENT DOCUMENTS

| | | | |
|---|---|---|---|
| 2,191,693 A * | 2/1940 | Havlis | A47G 23/0208 206/202 |
| 2,665,867 A | 1/1954 | McDonald | |
| 2,665,967 A | 1/1954 | McDonald | |
| 3,817,395 A * | 6/1974 | LeFever | A47F 5/12 211/181.1 |
| 5,893,539 A * | 4/1999 | Tran | H02G 3/0443 248/68.1 |
| 9,800,028 B1 * | 10/2017 | Smith | H02G 3/30 |

(Continued)

FOREIGN PATENT DOCUMENTS

| | | |
|---|---|---|
| CN | 106224654 A | 12/2016 |
| DE | 202014104540 U1 | 11/2014 |

(Continued)

*Primary Examiner* — Timothy J Thompson
*Assistant Examiner* — Michael F McAllister
(74) *Attorney, Agent, or Firm* — Dykema Gossett PLLC (57) ABSTRACT

Various embodiments of the present disclosure are directed to cable trays for carrying cables. In one such embodiment, a cable tray made of wire material is disclosed with a number of lateral U-bent wires and longitudinal wires fastened thereto. The U-bent wires form a bottom and a first and a second side wall for the cable tray, where the bottom is narrower than the side walls are high, as such the cables may be placed stacked one above another in the cable tray. The first side wall is made with a wavy shape with wave troughs placed close to or in contact with the second side wall and wave crests between the wave troughs. The wave-shaped first side wall forms, together with the second side wall, spaces for receiving cables.

13 Claims, 4 Drawing Sheets

(56) References Cited

U.S. PATENT DOCUMENTS

| | | | |
|---|---|---|---|
| 2004/0245411 A1* | 12/2004 | Phelan | H02G 3/0443 248/49 |
| 2016/0091116 A1* | 3/2016 | Shoecraft | H02G 3/0456 211/41.1 |
| 2016/0153587 A1* | 6/2016 | Smith | H02G 3/30 29/515 |
| 2018/0283583 A1 | 10/2018 | Dalisay | |

FOREIGN PATENT DOCUMENTS

| | | |
|---|---|---|
| EP | 2 924 834 A2 | 9/2015 |
| FR | 2991518 A3 | 12/2013 |
| FR | 3013796 A1 | 5/2015 |
| WO | 9608063 A1 | 3/1996 |
| WO | 2016202340 A1 | 12/2016 |

\* cited by examiner

CABLE TRAY INCLUDING U-BENT WIRES HAVING A FIRST SIDEWALL WITH A WAVY SHAPE FOR RECEIVING LATERALLY PLACED CABLES

CROSS-REFERENCE TO RELATED APPLICATIONS

This application is a national stage filing based upon International PCT application no. PCT/DK2019/050422, filed 20 Dec. 2019, which claims the benefit of priority to Denmark application no. PA 2019 70004, filed 3 Jan. 2019, and Denmark application no. PA 2019 70305, filed 13 May 2019.

FIELD OF THE INVENTION

The present invention relates to a cable tray for carrying cables and of the type that is made of wire material with a number of lateral U-bent wires and longitudinal wires fastened thereto, so that the U-bent wires form a bottom and a first and a second side wall for the cable tray, and where the bottom is narrower than the side walls are high, so that the cables may be placed laterally in the cable tray.

By cable as used in the present application, means elongated elements, which may carry various media and/or signals. Thus, cables may comprise hoses for liquid or gaseous media and electric cables and signal cables.

BACKGROUND OF THE INVENTION

Cable trays are rectangular modules, which comprise a bottom and two side walls on the longitudinal sides of the bottom. The plane of the side walls is normally substantially perpendicular to the plane of the bottom, but other angles between bottom and side walls are also possible.

Cable trays are known that are made of wire material with U-bent wires and longitudinal wires fastened thereto at the bottom and the sides.

The cable trays are fastened to machines, buildings or other support where it is necessary to establish an ordered cable routing. Cable trays are mounted on the support and most often with several cable trays end to end. Mounting takes place by means of fittings, brackets or similar, which are fastened to the support.

In the case of vertical mounting on a vertical support, for example a wall or machine frame, the side walls of the cable trays in the narrow cable trays will run essentially parallel to the plane of the support. Narrow cable trays may also be mounted on substantially vertical or inclined supports, for example in the case of sloping walls or ceilings.

Cable trays will often have a relatively wide bottom and relatively lower side walls. In wide cable trays of this kind, cables are arranged side by side and optionally in several layers. The cables are typically of such a small diameter that up to 5-10 cables can be placed side by side.

Narrow cable trays are also known, where the bottom is relatively narrow, and the side walls are relatively high. In cable trays of this kind, cables are typically arranged in several layers one above another with few if any cables placed side by side. The cables in cable trays of this kind typically have a diameter that is a little less than the distance between the two side walls, so that typically two cables cannot be placed beside one another.

The cables may either be put in cable trays loose, or they may be fastened to the cable tray with commonly used fasteners, for example brackets, cable strips or the like for cables, hoses and/or pipes.

In cable trays made of wire it is thus easy to fasten the cables with suitable space to selected wires in the cable tray.

As it takes time when mounting and replacing cables to fasten these to the cable trays, it is desirable if they can be placed loose in the cable trays. However, this is difficult in the case of cable trays in places where cleaning is required. Cable trays and cables placed therein are typically cleaned by high-pressure washing. This presents a risk that the cables may become disorderly and may even be forced right out of the cable trays, unless they are fastened to the cable trays.

With a view to cleaning, in some installations it is preferred to use narrow cable trays, as dust build-up is minimized when the cables are stacked one above another.

When the cable trays are mounted laterally with cables stacked one above another in the vertical direction, it is normal to use narrow cable trays. If we want the cables to be placed orderly and without risk of being forced out of the cable trays during cleaning, it is necessary to fasten the cables to the tray to ensure that they remain in the cable trays.

DK178644 B9 relates to a cable tray for carrying cables and hoses of the type that is made of wire material with a number of lateral U-bent wires and longitudinal wires fastened thereto, thus forming a bottom and side walls for the cable tray. The cables may be placed laterally, stacked one above another in the cable tray. Even though this cable tray offers advantages with easy and effective cleaning, the cables may be in contact with one another, as all are placed within a space formed between the U-shaped wires.

A cable tray of the type mentioned in the introduction is known from U.S. Pat. No. 5,893,539. In this type of cable tray, wires are used that are bent into a bow shape. Thus, these wires cannot be bent easily for placing cables or hoses in the cable tray.

DK 2017 70742 describes a cable tray of the type mentioned in the introduction, where to the U-bent wires are fastened directly or indirectly bent wire sections, which are mounted with a spacing to ensure an easy to clean distance between the cables. This construction ensures that the cables are not in contact with one another. However, this construction is time-consuming to produce because of mounting the bent wire sections onto the U-bent wires. They are typically mounted by welding.

AIM OF THE INVENTION

The aim of the invention is to provide a cable tray, where the individual cables are placed with a distance, wherein cleaning between cables is possible and that in addition is simple to produce.

DESCRIPTION OF THE INVENTION

The aim of the invention can be achieved with a cable tray of the type stated in the introduction, which has the distinctive features that the first side wall is produced with a waveform with wave troughs placed close to or in contact with the second side wall and wave crests between the wave troughs, and that the wave-shaped first side wall plus the second side wall form spaces for receiving the cables to ensure an easy to clean distance between the cables.

By wave trough means the wire section of the first side wall that is located closest to the second side wall. Thus, it is not a question of a single point, but a region around the point that can be regarded as the vertex of the wave trough. Correspondingly, by wave crest means the wire section of the first side wall that is located farthest from the second side wall. Thus, it is not a question of a single point, but a region around the point that can be regarded as the vertex of the wave crest.

As a result, cables or hoses are fixed in a cable tray by the wave-shaped first side wall, which, together with the second side wall, forms several lateral spaces, which are separated from one another and ensure that the cables are held at a mutual distance from one another. Thereby, well-defined cable routing is obtained.

One or more cables can be accommodated in each of the separate spaces.

The cable tray may be used in any configuration in combination with cables. The actual configuration will thus be adjusted to the actual shape of the cables used.

The distance between and the form of the wave troughs and wave crests can be adapted to the cables. The distance may be larger in order to create distance between the cables. This avoids the cables being squeezed. Alternatively, larger distance can provide a larger space, where several or larger cables can be accommodated.

The distance between the vertex of the wave trough and the second side wall may preferably be less than the diameter of the cables. This gives stable holding of the cables in the space where they are placed. During high-pressure cleaning, the cables will not be able to move from the space where they are mounted.

The distance between the cables is well-defined, as it is determined by the dimensions of the waveform.

At the least, the wire material that is used for forming the first wall may advantageously be elastic. Typically, the first and the second side wall and the bottom will be formed from one length of wire material, which is bent to a desired shape.

The transverse U-bent wires are typically fastened to the longitudinal wires by welding. However, it is also possible to produce the cable tray from wire of dimensionally stable plastic, which is soldered, welded or glued together.

The advantage with the cables being placed with a distance in the cable tray is that it is possible to clean the cables in the cable tray, because for example in high-pressure cleaning with either water or steam or chemical cleaning agents it is possible to clean the surface of the cables. At the same time, the cable tray is formed from wires, which are cleaned in the same way, when actual cleaning of the cable tray is being carried out. This is extremely important if the cable tray is to be used for example in the food industry or in the chemical industry, including the biochemical industry. Other places where very careful cleaning may also be of interest is in clean-room production, as used on a large scale for example in the production of semiconductors.

With the particular embodiment of a cable tray, where the cables are guaranteed a spacing apart, better heat conduction away from the cables is also obtained, if we are considering power cables, which have a certain power dissipation. Distance between the cables may also mean a reduction of any noise transfer between cables, where a relatively large power transport may perhaps take place in certain cables, while other cables are purely signal cables.

If cables are very close together, there may be capacitive transfer of noise from various types of cables, which to a certain extent may have a disturbing effect on any signal communication. Precisely inside production plants, where the production is to take place while taking sterility into account, in many cases there will be a very large number of signal cables, which will transmit signals for monitoring and controlling processing plant. By ensuring a physical distance between the individual cables, there will thus be a reduction in capacitive transfer of any noise between signal cables and power cables that are used for power regulation of motors, pumps or valves.

The cable tray is normally made of metal wire, including in particular corrosion-resistant materials, for example steel, steel alloys, such as AISI 316 or 304 steel grades, and/or hot-dip or electro-galvanized steel, aluminium, aluminium alloys or similar easy-to-clean materials. Easy-to-clean cable trays are obtained as a result, and as the cable trays are made of wire, it is also possible to clean the cables that are mounted in the trays without having to separate the cable trays. It is therefore possible to use the cable trays in situations where frequent cleaning is necessary, for example because of regulatory requirements, such as in the pharmaceutical industry, and the food industry, including abattoirs.

The wires in the cable tray are soldered or welded together at the contact points where two wires cross. However, it is also possible to make the cable tray of wire of dimensionally stable plastic, which is soldered, welded or glued together.

The wires used have a diameter between 2 and 25 mm; typically between 3 and 5 mm.

The diameter of the wire is typically between 2 and 25 mm and depends on the size of the cable tray and the desired carrying capacity for pipes/hoses or the cable tray and hence the weight that the cable tray will have to be able to carry. Generally the longitudinal wires will have a larger diameter than the U-bent wires.

However, it is important for the wires that are used for forming the side walls to have a thickness and material properties that make easy bending possible. This bending is carried out using tools.

A suitable material for the U-bent wires for forming the side walls is stainless steel wire. These wires may have a diameter of 3 mm and a tensile strength of 840-900 N/mm$^2$. This wire can be bent by hand without using a tool and will be dimensionally stable in the bent state. Together with wires of this kind, it is preferable to use longitudinal wires that have a larger diameter, typically a diameter of 4 mm.

During manufacture of a cable tray, a wire rod for making the side walls and the bottom can be inserted in a tool. Then swiveling and bending the wire into a wave shape can be carried out in a single operation, so the two side walls are placed opposite one another at the same time as an end section of the second side wall is bent towards the first side wall. The bottom in the U-bent wire can be formed as a curved shape or be formed as a straight part that is joined via a curved part to each of the side walls.

The U-bent wires formed may be put in a fixture in a known manner, where they are fastened to the longitudinal wires. This preferably takes place by welding at the contact points.

Even if the aforementioned cable is said to have a bottom and side walls, it will be usable in any orientation. The cables will be held in the cable tray as they pass through the row of spaces that are formed by each U-bent wire between the wave-shaped first side wall and the second side wall. These spaces will form closed spaces, where the cables are held in place regardless of the orientation of the cable tray.

The concepts bottom and side walls are thus not to be regarded as limiting the orientation of the way in which the cable tray can be used.

According to a further embodiment of the invention, the longitudinal wires are fastened externally on the U-bent wires. As a result, the external longitudinal wires will be in contact with any wall where the cable tray is to be suspended. This means that the cable tray may be fastened with fasteners fastened to the longitudinal wires, whereby effective fastening of the cable tray is obtained.

According to a further embodiment, the cable tray according to the invention is characterized in that the wire in the second side wall is longer than the wire in the first side wall, that a wire section that goes past the extension of the wire in the first side wall is bent towards and past an end section of the wire in the first side wall of the cable tray, and in that a longitudinal wire is fastened on the aforementioned wire section of the wire in the second side wall of the cable tray.

As a result, owing to the elasticity of the wire, the first side wall of the cable tray can be turned in behind the longitudinal wire, when the cables are fitted in the cable tray. The end section of the first side wall will then be up against the longitudinal wire, so that the cable tray is held closed. The aforementioned end section of the wire in the first side wall of the cable tray will thus be located in use in a position between the second side wall and the longitudinal wire at the aforementioned end section of the wire in the first side wall of the cable tray.

According to a further embodiment, the cable tray according to the invention is characterized in that at least one wave trough from the first side wall is placed in contact with the second side wall and in that fastening to the wire in the second side wall is established.

Fastening will be established after cables are fitted in the cable tray. Fastening may be established as a spot weld, a spot soldering with a strip or in some other way that fastens the wires in the two side walls to one another in at least one point. This establishes stability in the cable tray and ensures that the cable tray does not open accidentally by the two side walls turning away from one another. This prevents the risk of the cables moving between lateral spaces in the cable tray or even being removed from the cable tray.

According to a further embodiment, the cable tray according to the invention is characterized in that the waveform on the first side wall is established in such a way that the spaces that are formed between the first side wall and the second side wall are larger than other spaces that are formed between the first side wall and a line joining the vertices of the wave crests. As a result, over the width of the cable tray, several of the first-mentioned spaces may be established, which are separate from the other spaces that will have a smaller extent than the closed spaces. This is an advantage, as the first-mentioned spaces are closed spaces, through which the cables pass and are thus held in place in the cable tray.

According to a further embodiment, the cable tray according to the invention is characterized in that the waveform on the first side wall is established in such a way that the spaces that are formed between the first side wall and the second side wall are identical to other spaces that are formed between the first side wall and a line joining the vertices of the wave crests.

According to a further embodiment, the cable tray according to the invention is characterized in that the lateral U-bent wires are only fastened to the longitudinal wires on the wire sections that are used for forming the second side wall of the cable tray.

As a result, the second side walls can be turned individually between an open and a closed position, which may be an advantage if there is a need for individual replacement of cables in the cable tray.

However, it is also possible for the cable tray to be supplied in a closed state, so that the wave-shaped first side wall is fastened in relation to the second side wall. As the lateral U-bent wires are applied a distance apart on the longitudinal wires, cables may simply be pulled through the spaces that are formed in the cable tray. This may take place both during cable-laying and during any cable replacement.

The lateral U-bent wires may be provided with mutual distance between 60 and 100 mm. The distance is preferably between 70 and 90 mm, and typically approx. 80 mm.

According to a further embodiment, the cable tray is characterized in that the height of a cable tray is between 70 and 120 mm. These are suitable dimensions for a high proportion of cable trays that are used for carrying signal cables and electric cables.

According to a further embodiment, the cable tray is characterized in that all lateral U-bent wires in the cable tray are produced in such a way that the spaces that are formed between the first side wall and the second side wall are aligned, and so that the other spaces that are formed between the first side wall and a line joining the vertices of the wave crests are also aligned.

With this embodiment, all the spaces that are formed between the first and the second side wall in the lateral U-bent wires will be in a line. As a result, cables that are placed in the cable tray will lie parallel in line and be held in the closed spaces in the U-bent wires of the cable tray. As a result, a space is provided that is defined by the shape of the waveform.

In this embodiment, the waveform will in most cases be shaped so that a relative second space is formed so as to be able to place as many cables as possible in the cable tray.

It may also be desirable to put several cables in the cable tray. This may take place by transferring the placement of the closed spaces in subsequent U-bent wires, so that the cables are only held in every other one of the U-bent wires in the longitudinal direction of the cable tray.

According to a further embodiment, the cable tray is characterized in that the lateral U-bent wires in the cable tray are produced in such a way that the spaces that are formed between the first side wall and the second side wall, and other spaces that are formed between the first side wall and a line joining the vertices of the wave crests are located on a line alternately, so that cables that are fitted in the cable tray are placed in the first-mentioned space and the other space, alternately.

With the spaces that are formed between the first and the second side alongside the spaces that are formed between the first side wall and a line joining the wave crests, a situation is obtained in which the closed spaces are continued relative to one another in every other one of the U-bent wires in the cable tray. It is thus possible to place cables with parallel orientation in the cable tray so that they are held in the closed spaces and are placed alternately in the open spaces. This principle may be applied when the cables have sufficient stiffness to be held securely just by being placed in closed spaces in every other one of the U-bent wires in the longitudinal direction of the cable tray. This solution gives a closer placement of the cables and hence the possibility of placing several cables in one cable tray.

It is possible for a first space, which is formed nearest the bottom, to have a larger extent than the other spaces that are formed between the wave-shaped first side wall and the second side wall. As a result, several cables may be accommodated in this first space. This is especially advantageous when cables are held alternately in the first-mentioned closed spaces in the U-bent wires and in the other open spaces.

DESCRIPTION OF THE DRAWING

The invention is explained in more detail hereunder, referring to the appended drawing, where.

DETAILED DESCRIPTION OF THE INVENTION

In the description of the figures, identical or equivalent elements will be denoted with the same reference symbol in the various figures. Therefore explanations will not be given for all details in connection with each individual figure/embodiment.

REFERENCE SYMBOLS

Figure 1:
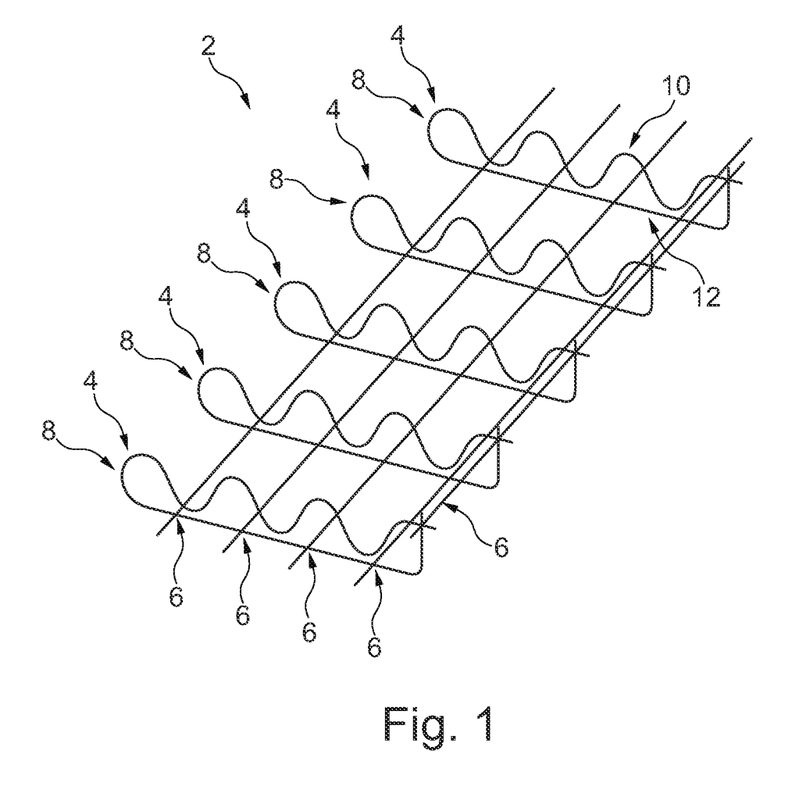
FIG. 1 shows a partial perspective sketch of a cable tray according to the invention.
Figure 2:
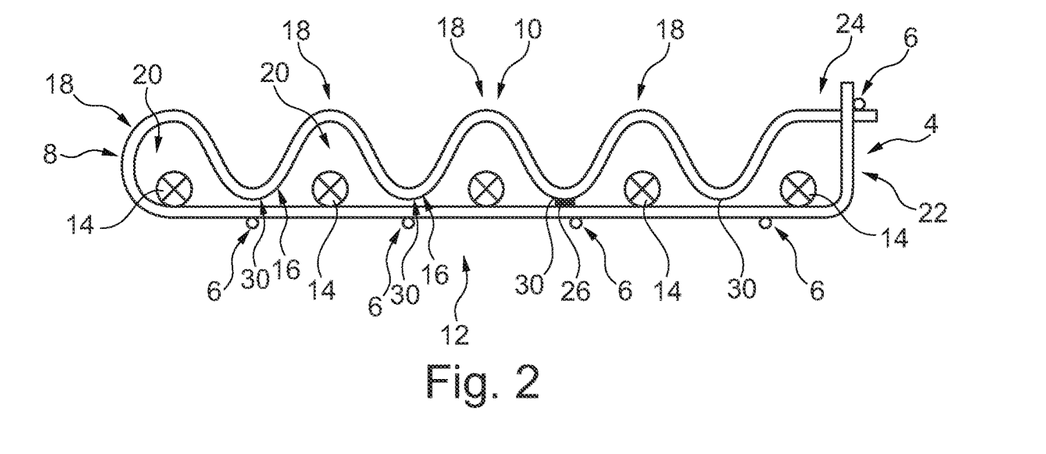
FIG. 2 shows a sketch of the cable tray shown in FIG. 1 viewed from the end and with cables shown in the cable tray.

2 Cable tray
4 U-bent wires
6 Longitudinal wires
8 Bottom
10 First side wall
12 Second side wall
14 Cable
16 Wave trough
18 Wave crest
20 Space
22 Wire section of second side wall
24 End section of wire in first side wall
26 Fastening
28 Vertex of wave crest
30 Vertex of wave trough
32 Other space
34 Line through vertices of the wave crests FIG. 1 shows a mounting element according to the invention, and FIG. 2 shows an illustration of this cable tray viewed from the end.

FIG. 1 shows a sketch of a cable tray 2 according to the invention. The cable tray is produced by fastening a number of U-bent wires 4 to a row of parallel longitudinal wires 6. The U-bent wires form a bottom 8 and a first side wall 10 and a second side wall 12 for the cable tray. The bottom 8 will be narrower than side walls 10, 12, so that the cables may be placed stacked one above another in the cable tray but without touching one another.

The mutual distance between the cables is created by making the first side wall 10 with a wavy shape with wave troughs 16 placed close to or in contact with the second side wall 12 and with wave crests 18 located between them. The wave-shaped first side wall 10 will, together with the second side wall 12, form spaces for receiving cables 14 with a spacing apart that ensures easy, effective cleaning.

The cable tray is produced by placing U-bent wires laterally and fastening them by welding to the longitudinal wires 6, as illustrated in FIG. 1. Only a section of a cable tray is shown in FIG. 1. The length of the cable tray may vary and be formed in sections of one metre up to 8-10 metres.

The length of a cable tray section will depend on the intended use.

As can be seen from FIG. 2, the longitudinal wires 6 are fastened externally on the U-bent wires 4.

The cable tray will be made of wires of stainless steel, where the diameter of the wire in the U-bent wires is 3 mm. The diameter of the wire for the longitudinal wires will be 4 mm.

As can be seen especially clearly in FIG. 2, the second side wall 12 has a longer extent, so that a wire section 22 extends beyond the extent of the wires in the first side wall 10. This wire section 22 is bent towards an end section 24 of the first side wall 10 of the cable tray. On the end section 24, the wire is fastened to a longitudinal wire 6 with an outer end of the wire section 22. As a result, the first side wall 10 can be swiveled by elastic deformation and be pressed-in past the longitudinal wire 6, so that the cable tray assumes a closed state.

Alternatively, it is possible to omit the longitudinal wire 6. As an alternative, reliable closure of the cable tray can be established by providing a fastening 26 between the first side wall and the second side wall.

In the situation shown, only a single fastening 26 is shown, at the vertex 30 for a wave trough 16 and the opposite second side wall 12. A fastening may be provided between each individual wave trough and the opposite side wall or for some other wave trough than that shown.

When a catch is used between the end section 24 and the longitudinal wire 6, the wire in the first side wall 10 will be located between the second side wall 12 and the longitudinal wire 6. It may thus be said that the longitudinal wire 6 retains the first side wall and prevents it swiveling out and making opening of the cable tray possible, and hence a risk of the cables being placed in contact with one another.

It is possible to use a combination of one or more fastenings 26 and the catch between the end section 24 and the longitudinal wire 6.

Figure 3:
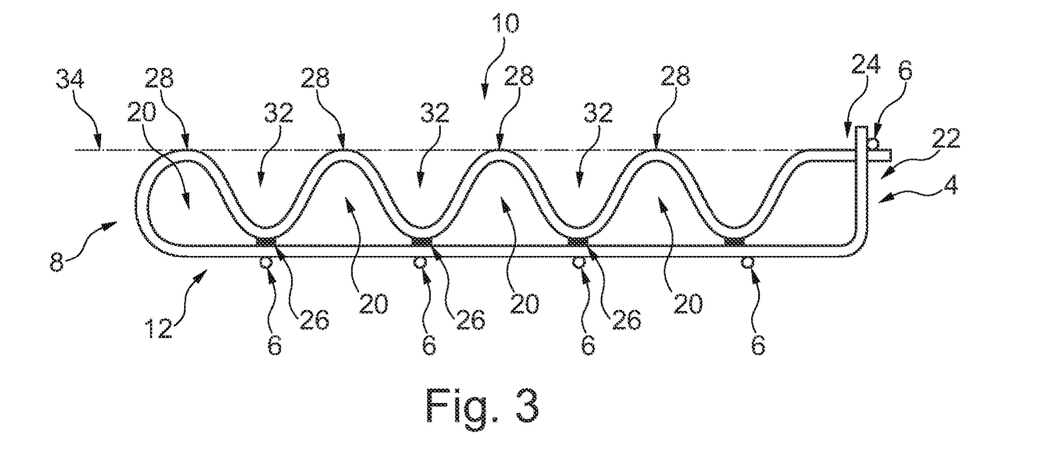
FIG. 3 shows a sketch, corresponding to FIG. 2, of a further embodiment of a cable tray according to the invention.

FIG. 3 shows a schematic diagram corresponding to FIG. 2 in another embodiment. Here it can be seen that the wavy shape is provided in such a way that the spaces 20 that are formed between the wave-shaped first side wall and the second side wall 12 are larger than the space 32 that will be formed between the first wave-shaped side wall 10 and a line 34 joining the vertices 28 of the wave crests 18.

As a result, the greatest possible space is provided for accommodating cables in relation to the total volume that is occupied by a cable tray.

For all the embodiments shown in FIGS. 1-3, the longitudinal wires 6 will only be fastened to the part of the U-bent wires that is used for forming the second side wall 12. The second side wall 12 also includes the bent-over wire section 22.

Thus, there will not be mutual holding between lateral wire sections that are used for forming the first side wall 10. This makes it possible to open and close the cable tray partially by only opening one or more of the U-bent wires. This may be advantageous when replacing cables.

The cable tray may be used when supplied with the form shown in FIGS. 2 and 3, so that cables are pulled through a row of U-bent wires located in a line. Alternatively, the cable tray may be supplied as an open cable tray, where the cables are inserted and closed gradually as the spaces are filled up.

Finally it should be noted that FIGS. 2 and 3 shows the U-bent wires of the cable trays with a horizontal orientation.

However, it will typically be applied with a vertical orientation, so that the bottom 8 will face downwards and the side walls 10, 12 will be oriented vertically upwards from the bottom 8.

Figure 4:
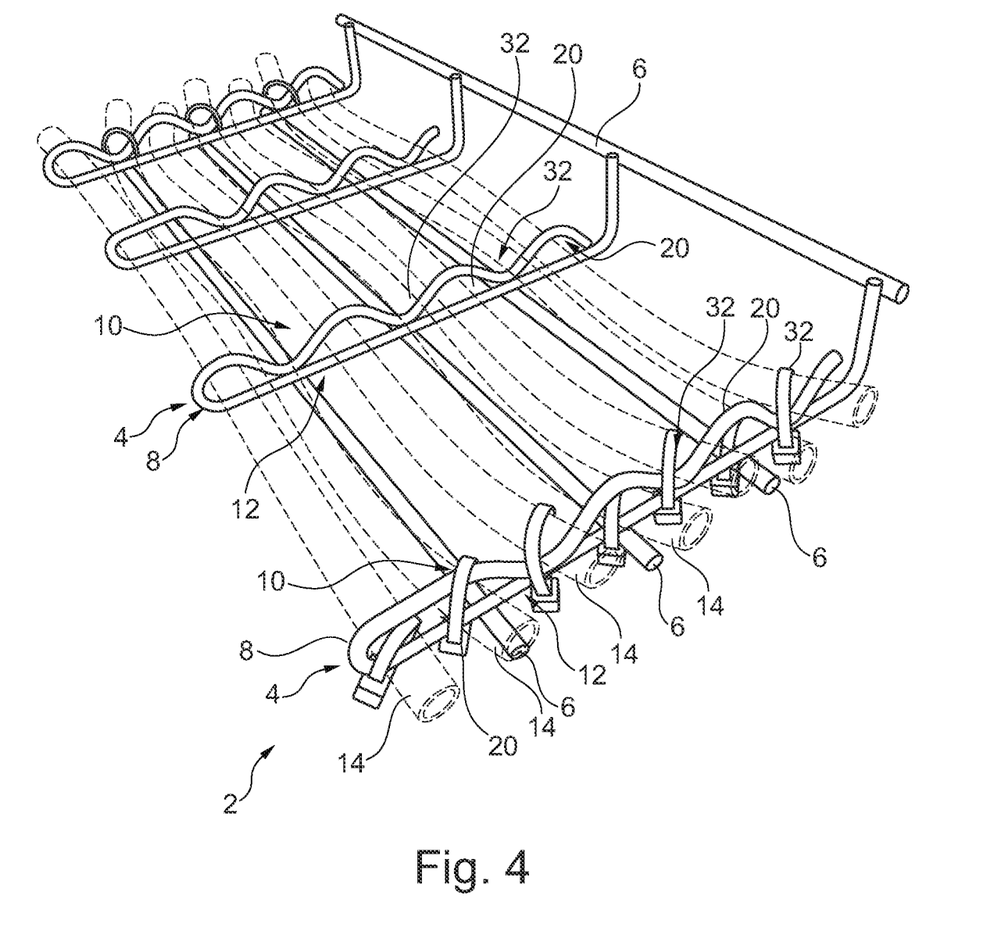
FIG. 4 shows a partial perspective sketch of a further embodiment of a cable tray according to the invention.
Figure 5:
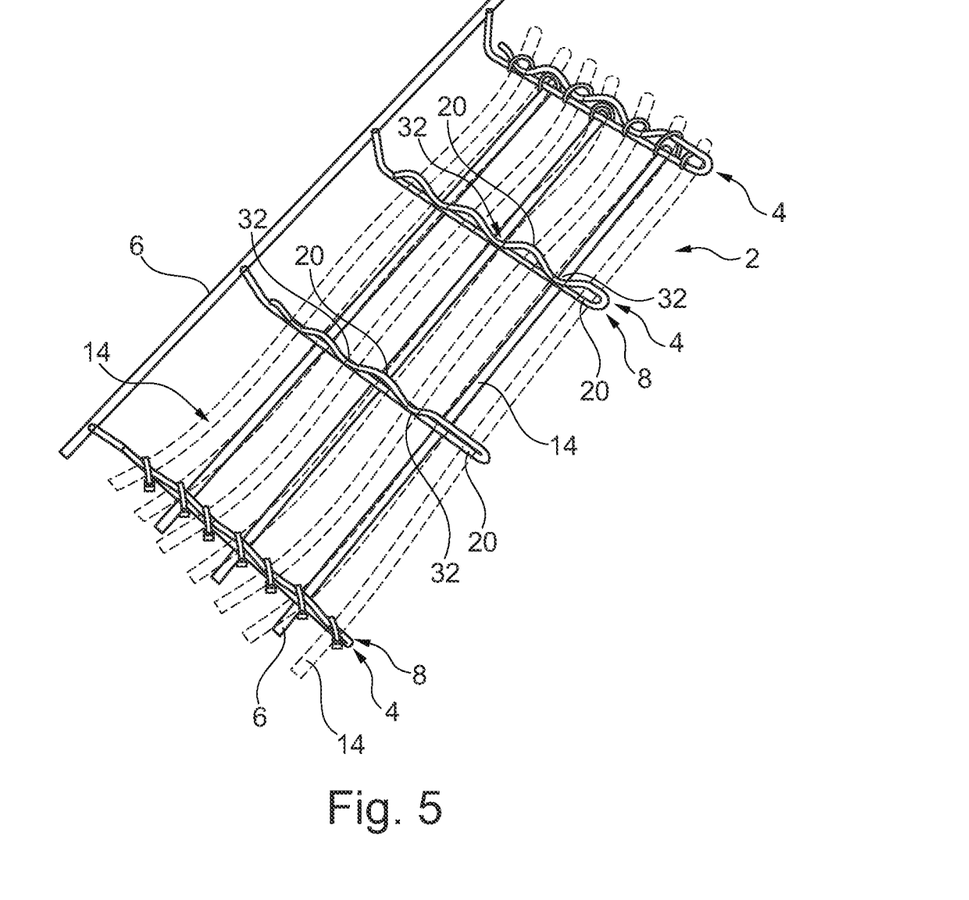
FIG. 5 shows a sketch of the cable tray shown in FIG. 4, viewed from above.

FIGS. 4 and 5 show another embodiment of the cable tray 2.

Only a section of the cable tray 2 is shown. In practice, the cable tray will have a longer extent. It should also be noted that the strips shown are not used in practice. In practice, the cables 14 will not be held with said strips, but will be held on being placed in the spaces 20.

As can be seen from FIG. 4, the cables 14 are placed alternately in a space 20 that is formed between the first wave-shaped side wall 10 and the second side wall 20 and the other space 32 that is formed between the first side wall 10 and a line 34 (not shown in FIG. 4) joining the vertices of the wave crests, as illustrated in FIG. 3.

With this alternating placement, the cables 14 are held in every other one of the U-bent wires 4 shown. In practice, this will be sufficient for the vast majority of cables that are placed in the cable tray 2. With this embodiment, the cable trays will thus be able to hold a number of cables corresponding to the number of wave troughs and wave crests in the wave-shaped first side wall 10.

As it is preferable for the cables to run parallel in the longitudinal direction of the cable tray, the spaces 20 and 32 are placed end to end in the longitudinal direction of the cable tray in order to establish the alternating placement of a cable in space 20 and in space 32, when the cable is extended in the longitudinal direction of the cable tray.

In the embodiment shown, space 20 that is located closest to the bottom 8 is shaped with double the width, so that it contains two cables 14. As a result, the outer cable 14, as shown in FIG. 4, will be held on all the U-bent wires. On the other hand, the next and the other cables 14 will be held in an alternating placement in space 20 and space 32.

FIG. 5, which shows the cable tray shown in FIG. 4 viewed from above, illustrates more clearly how the cables 14 run parallel to the longitudinal direction of the cable tray and thus also parallel to the longitudinal wires 6 in the cable tray.

The invention claimed is:

1. A cable tray for carrying cables, the cable tray comprising:
    wire material including
        a number of lateral U-bent wires, and
        longitudinal wires fastened to the U-bent wires, so that the U-bent wires form a bottom and a first and a second side wall for the cable tray, and where the bottom is narrower than the side walls are high, the cable tray configured and arranged so that the cables may be placed laterally in the cable tray, and
    wherein the first side wall is a wavy shape with wave troughs placed close to or in contact with the second side wall and wave crests between the wave troughs, and in that the first side wall together with the second side wall forms spaces configured and arranged for receiving the laterally placed cables and to prevent contact between adjacent cables.

2. The cable tray according to claim 1, wherein the U-bent wires are fastened to the longitudinal wires by welding.

3. The cable tray according to claim 1, wherein the longitudinal wires are fastened externally to the U-bent wires.

4. The cable tray according to claim 1, wherein the wires consist of stainless steel.

5. The cable tray according to claim 4, wherein the diameter of the wire is 3 mm, and the wire has a tensile strength between 840-900 1 N/mm$^2$.

6. The cable tray according to claim 1, wherein a first U-bent wire forming the second side wall is longer than a second U-bent wire forming the first side wall, a wire section of the second U-bent wire extends past an extension of the wire in the first side wall and is bent towards and past an end section of the wire in the first side wall of the cable tray, and a longitudinal wire is fastened on the wire section of the second U-bent wire in the second side wall of the cable tray.

7. The cable tray according to claim 6, wherein the end section of the second U-bent wire in the first side wall of the cable tray is positioned between the second side wall and the longitudinal wire on the end section of the second U-bent wire in the first side wall of the cable tray.

8. The cable tray according to claim 1, wherein at least one wave trough from the first side wall is placed in contact with the second side wall and configured and arranged to secure a wire between the first and second side walls.

9. The cable tray according to claim 1, wherein the spaces formed between the first side wall and the second side wall are larger than other spaces that are formed between the first side wall and a line joining the vertices of the wave crests.

10. The cable tray according to claim 1, wherein the spaces formed between the first side wall and the second side wall are identical to other spaces that are formed between the first side wall and a line joining the vertices of the wave crests.

11. The cable tray according to claim 1, wherein the lateral U-bent wires are only fastened to the longitudinal wires on the wire sections that form the second side wall of the cable tray.

12. The cable tray according to claim 1, wherein the spaces between the first side wall and the second side wall are aligned, and other spaces between the first side wall and a line connecting the vertices of the wave crests are also aligned.

13. The cable tray according to claim 1, wherein the spaces between the first side wall and the second side wall, and other spaces between the first side wall and a line joining the vertices of the wave crests are located in an alternately aligned, the cable tray configured and arranged so that cables that are fitted in the cable tray are placed alternately in the spaces and the other spaces.

* * * * *